United States Patent
Dowaki et al.

(10) Patent No.: US 10,722,836 B2
(45) Date of Patent: Jul. 28, 2020

(54) HYDROGEN RECOVERY METHOD

(71) Applicants: Japan Blue Energy Co., Ltd., Tokyo (JP); Tokyo University of Science Foundation, Tokyo (JP)

(72) Inventors: Naoki Dowaki, Tokyo (JP); Mitsuo Kameyama, Tokyo (JP); Kiyoshi Dowaki, Tokyo (JP)

(73) Assignees: Japan Blue Energy Co., Ltd., Tokyo (JP); Tokyo University of Science Foundation, Tokyo (JP)

(*) Notice: Subject to any disclaimer, the term of this patent is extended or adjusted under 35 U.S.C. 154(b) by 0 days.

(21) Appl. No.: 15/771,197

(22) PCT Filed: Oct. 28, 2015

(86) PCT No.: PCT/JP2015/080452
§ 371 (c)(1),
(2) Date: Apr. 26, 2018

(87) PCT Pub. No.: WO2017/072891
PCT Pub. Date: May 4, 2017

(65) Prior Publication Data
US 2018/0318749 A1 Nov. 8, 2018

(51) Int. Cl.
*B01D 53/047* (2006.01)
*C01B 3/56* (2006.01)
(Continued)

(52) U.S. Cl.
CPC .............. *B01D 53/047* (2013.01); *C01B 3/56* (2013.01); *C10K 1/32* (2013.01); *C10K 3/04* (2013.01);
(Continued)

(58) Field of Classification Search
CPC .................................. B01D 53/047; C01B 3/56
See application file for complete search history.

(56) References Cited

U.S. PATENT DOCUMENTS

| 5,669,960 A * | 9/1997 | Couche ................ B01D 53/047 423/359 |
| 2010/0113265 A1* | 5/2010 | Suzuki .................. B01D 53/02 502/408 |
| 2012/0014851 A1 | 1/2012 | Kloosterman et al. |

FOREIGN PATENT DOCUMENTS

| CA | 2496907 A1 | 3/2004 |
| CN | 1334135 A | 2/2002 |

(Continued)

OTHER PUBLICATIONS

Machine translation of JP 2009/226257 pp. 1-15 downloaded Mar. 26, 2019 (Year: 2019).*

(Continued)

*Primary Examiner* — Douglas B Call
(74) *Attorney, Agent, or Firm* — Westerman, Hattori, Daniels & Adrian, LLP (57) ABSTRACT

Provided is a hydrogen recovery method such that highly concentrated hydrogen gas can be obtained efficiently by adsorbing and removing hydrocarbon gas such as carbon dioxide, carbon monoxide, and methane, using a relatively low pressure, from pyrolysis gas obtained by heat treating biomass. The present invention is the method for recovering hydrogen from pyrolysis gas obtained by heat treating biomass, characterized by including: a first purifying step of adsorbing and removing gas that mainly includes carbon dioxide under pressure from the pyrolysis gas to purify the pyrolysis gas; and a second purifying step of further adsorbing and removing gas that includes carbon dioxide under pressure from purified gas obtained by the first purifying step at a pressure lower than the pressure in the first purifying step to purify the purified gas in order to recover hydrogen from the purified gas.

7 Claims, 2 Drawing Sheets

(51) Int. Cl.
*C10K 1/32* (2006.01)
*C10K 3/04* (2006.01)
*B01D 53/00* (2006.01)
(52) U.S. Cl.
CPC ........ *B01D 53/002* (2013.01); *B01D 2256/16* (2013.01); *B01D 2256/20* (2013.01); *B01D 2256/22* (2013.01); *B01D 2257/504* (2013.01); *C01B 2203/043* (2013.01); *C01B 2203/0475* (2013.01); *Y02P 20/152* (2015.11)

(56) References Cited

FOREIGN PATENT DOCUMENTS

| | | |
|---|---|---|
| EP | 2253915 A1 | 11/2010 |
| JP | 60-103002 A | 6/1985 |
| JP | 2004-292240 | 10/2004 |
| JP | 3670229 B2 | 7/2005 |
| JP | 4246456 B2 | 4/2009 |
| JP | 2009-226257 A | 10/2009 |
| JP | 2112-12635 A | 1/2012 |
| JP | 5039408 B2 | 10/2012 |
| JP | 5134252 B2 | 1/2013 |
| JP | 5463050 B2 | 4/2014 |
| JP | 5647388 B2 | 12/2014 |
| WO | WO88/01611 * | 3/1988 |
| WO | 2012/014277 A1 | 2/2012 |
| WO | 2015/011826 A1 | 1/2015 |

OTHER PUBLICATIONS

International Search Report dated Dec. 28, 2015, issued in counterpart International Application No. PCT/JP2015/080452 (2 pages).

* cited by examiner

HYDROGEN RECOVERY METHOD

TECHNICAL FIELD

The present invention relates to a hydrogen recovery method, and more specifically relates to a method for recovering hydrogen from pyrolysis gas obtained by heat-treating biomass. In the present invention, the term "pyrolysis gas" includes the above-described pyrolysis gas obtained by heat-treating biomass, gas obtained by further steam-reforming the pyrolysis gas, and the like.

BACKGROUND ART

In recent years, household cogeneration apparatuses and fuel-cell vehicles using solid polymer-type fuel cells have been practicalized and commercialized. Accordingly, research and development of techniques for producing, storing and transporting hydrogen have been activated.

Conventionally known methods for producing hydrogen include, e.g.; a method for separating and recovering hydrogen from coke oven gas; a method for separating and recovering hydrogen from blast furnace gas; a method for separating and recovering hydrogen from naphtha-reformed gas generated in a petroleum refining complex; a method for separating and recovering hydrogen generated from a salt electric field; a method for producing hydrogen by electrolysis of water; and the like. Recently, techniques such as a method for separating and recovering hydrogen from methanol-reformed gas or a method for separating and recovering hydrogen from natural gas and methane-reformed gas have been established and practicalized.

As recent new approaches, a method for producing hydrogen by means of algae using hydrogen fermenting bacteria; a method for producing hydrogen by means of water electrolysis using electric power from solar power generation, wind power generation and small hydroelectric generation; a method for separating and recovering hydrogen obtained by pyrolysis gas of biomass, and the like have been proposed, and some of them have been demonstrated.

As techniques for storing and transporting hydrogen: a method in which hydrogen is charged into a high-pressure gas cylinder, and stored and transported in that state; a method in which an organic solvent such as naphthalene or toluene is hydrogenated (e.g., naphthalene is transported in a form of tetralin, or toluene is transported in a form of methylcyclohexane), and then separated into naphthalene or toluene and hydrogen at each demander so as to utilize hydrogen, and the like have been proposed.

With respect to the method for producing hydrogen as described above, in a method other than water electrolysis, the obtained hydrogen should be separated and recovered from other gas such as carbon dioxide, carbon monoxide, a hydrocarbon gas including methane, or toluene, naphthalene and the like. In addition, a variety of such methods for separating and recovering hydrogen gas from other gas have been proposed.

As a gas separation method for blast furnace gas containing carbon dioxide, nitrogen, hydrogen and carbon monoxide, a pressure swing adsorption-type gas separation method carried out by using a plurality of an adsorption column filled with an adsorbent having a carbon dioxide adsorption capacity higher than each of hydrogen, carbon monoxide and nitrogen absorption capacity and a hydrogen adsorption capacity lower than each of carbon monoxide and nitrogen adsorption capacities, e.g., an active carbon, or for example, a separation method of a blast furnace gas in which mainly carbon dioxide in blast furnace gas is adsorbed into the above-described adsorbent by PSA (Pressure Swing Adsorption) in a high pressure state, and mainly hydrogen is recovered as an unadsorbed gas, has been disclosed (Patent Document 1). In Examples, a separation method using a single-stage PSA with three adsorption columns and an apparatus therefor are used, and thereby carbon dioxide and hydrogen are separated from the blast furnace gas. This method was single-stage style and was carried out at a relatively low pressure of 300 kPa, but hydrogen concentration of the recovered gas was not so high as 60-70%.

A hydrogen producing apparatus has been disclosed comprising: a reforming reaction tube housing a reforming catalyst promoting a reforming reaction for producing hydrogen from hydrocarbons and water, and a carbon dioxide absorbent; a feed unit for feeding a source gas to the reforming reaction tube; a purification unit for separating the reformed gas output from the reforming reaction tube into a product gas with increased concentration of hydrogen and an off-gas with increased concentration of non-hydrogen components; a return unit for returning the off-gas from the purification unit to the feed unit; and a carbon dioxide-withdrawing unit for withdrawing carbon dioxide-rich gas from the reforming reaction tube by depressurizing the reforming reaction tube (Patent Document 2). In this apparatus, carbon dioxide produced by the reforming reaction is adsorbed in the reforming reaction tube, thereby a concentration of carbon dioxide is decreased to increase the concentration of hydrogen in the reformed gas. Thus, there have been necessities that the reforming reaction tube is filled with the carbon dioxide-absorbing material, and the reforming reaction tube is heated to high temperature in order to regenerate the carbon dioxide-absorbing material.

For a hydrogen-producing apparatus in which a hydrogen-containing gas is produced from a hydrocarbon as a raw material by a reformer, the produced hydrogen-containing gas is separated by a hydrogen purification apparatus (PSA) into hydrogen and a concentrated impurity gas containing concentrated gas components other than hydrogen, and the separated hydrogen is recovered as high purity hydrogen, a method for reducing an amount of carbon dioxide emission has been disclosed comprising: burning combustible components in the concentrated impurity gas by a combustion apparatus; and removing carbon dioxide in the combustion gas by a decarbonator (Patent Document 3). Herein, the decarbonator is filled with a carbon dioxide-adsorbing material, e.g., a calcium oxide adsorbent, and carbon dioxide can be adsorbed and removed, but the adsorbed carbon dioxide cannot be reused. In addition, there has been a problem that although the used adsorbent can be reused as a cement solidifying material, it cannot be reused as an adsorbent.

A hydrogen-producing method accompanied with recovery of a liquefied $CO_2$ has been disclosed, comprising: steam-reforming a natural gas fed in a form of liquefied natural gas into a hydrogen-rich reformed gas; separating and purifying hydrogen from this reformed gas; and using off-gas containing combustibles separated in the purification process of hydrogen as a main fuel for combustion and heating in the reforming process, in which method: pure oxygen or highly concentrated oxygen obtained by cryogenic separation using liquefaction cold of liquefied natural gas is introduced as an oxidizer for burning the off-gas in the reforming process; the $CO_2$ gas in the combustion exhaust gas generated in this combustion is concentrated to easily separate and recover the $CO_2$ gas in a liquid state from the combustion exhaust gas; separated and purified hydrogen is pre-cooled by the liquefied natural gas and then cooled and liquefied by liquid nitrogen obtained in the cryogenic air separation; and the liquefied natural gas after used for pre-cooling of hydrogen is utilized to liquefy the $CO^2$ gas and fed to the reforming process of hydrogen (Patent Document 4). There has been a problem that this method utilizes cold generated in vaporizing the liquefied natural gas, and thus the place for using the method is limited.

A hydrogen-producing and carbon dioxide-recovering method for producing hydrogen from carbon-containing fuel and recovering carbon dioxide has been disclosed, comprising: a hydrogen-containing gas producing process, in which the carbon-containing fuel is reformed to obtain the hydrogen-containing gas containing hydrogen and carbon dioxide; a PSA process, in which the hydrogen-containing gas is separated into first hydrogen-rich gas containing enriched hydrogen and PSA off-gas containing enriched components other than hydrogen by means of a pressure swing adsorption apparatus; a carbon dioxide-membrane separation process, in which the PSA off-gas is separated into carbon dioxide-rich gas containing enriched carbon dioxide and carbon dioxide separation membrane off-gas containing enriched components other than carbon dioxide by means of a carbon dioxide separation membrane; and a hydrogen membrane separation process, in which the carbon dioxide separation membrane off-gas is separated into second hydrogen-rich gas containing enriched hydrogen and hydrogen separation membrane off-gas containing enriched components other than hydrogen by means of a hydrogen separation membrane (Patent Document 5). In the method, a separation process by a single-stage PSA and an apparatus therefor are used, and the off-gas discharged from the PSA is further separated into the hydrogen-rich gas and the gas containing the enriched components other than hydrogen by using the carbon dioxide separation membrane and subsequently using the hydrogen separation membrane.

PRIOR ART DOCUMENTS

Patent Documents

Patent Document 1: JP Pat. No. 5647388
Patent Document 2: JP Pat. No. 5134252
Patent Document 3: JP 2004-292240 A
Patent Document 4: JP Pat. No. 3670229
Patent Document 5: JP Pat. No. 5039408
Patent Document 6: WO 2015/011826
Patent Document 7: JP Pat. No. 4246456
Patent Document 8: JP Pat. No. 5463050

SUMMARY OF INVENTION

Problem to be Solved

The present invention provides a hydrogen recovery method in which carbon dioxide, carbon monoxide and hydrocarbon gas such as methane is adsorbed and removed from pyrolysis gas obtained by heat-treating biomass at a relatively low pressure to efficiently recover highly concentrated hydrogen gas.

Solution to Problem

The aforementioned prior art describes a method for separating and recovering hydrogen and carbon dioxide from mixed gas containing hydrogen and carbon dioxide, carbon monoxide and hydrocarbon gas such as methane, and the method uses, as a separation apparatus, a so-called multi-column type single-stage adsorption and separation-style PSA apparatus, in which a plurality of adsorption columns are used in parallel arrangement. Furthermore, in order to enhance separation or removal of carbon dioxide, besides the PSA apparatus, an adsorbent or a separation membrane is additionally used in combination. In the multi-column type single-stage adsorption and separation-style PSA apparatus, although hydrogen could be separated and recovered at a relatively low pressure, the hydrogen concentration in the recovered gas was not to be sufficiently high. In addition, an excessively high pressure was not preferred from the viewpoint of not only increase of operation and apparatus costs but also safety of operation. Thus, it was conceived to use the adsorbent or the separation membrane in combination in order to increase the hydrogen concentration, but this was not to be preferred because of its high cost.

In order to solve the above problems, the inventors have already filed method for recovering hydrogen from pyrolysis gas obtained by heat-treating biomass, comprising: a first purification step in which carbon dioxide is adsorbed and removed from the pyrolysis gas under increased pressure to purify the pyrolysis gas; and a second purification step in which the purified gas obtained from the first purification step is further pressurized while keeping the pressure in the first purification step, and further purified by adsorbing and removing gas other than hydrogen from the purified gas under increased pressure to recover hydrogen from the purified gas, and in this method, carbon dioxide adsorbed and removed in the first purification step is recovered (Patent Document 6). According to this method, highly concentrated hydrogen can be recovered from the biomass pyrolysis gas at a relatively low pressure.

As a result of further various investigations on the hydrogen recovery method using a so-called multi-column type double-stage adsorption and separation-style PSA apparatus as described above, the inventors surprisingly found that even if the pressure in the second purification step was set to a pressure not higher than that in the first purification step, preferably even if the pressures in both of the first and second purification steps were set to low pressures of 0.15 MPa to 0.6 MPa, carbon dioxide, carbon monoxide, a hydrocarbon gas such as methane and the like could be sufficiently separated from the biomass pyrolysis gas to recover gas with highly concentrated hydrogen, and this finding led to the completion of the invention.

That is, the invention relates to:

(1) A method for recovering hydrogen from pyrolysis gas obtained by heat-treating biomass, comprising: a first purification step in which gas mainly containing carbon dioxide is adsorbed and removed from the pyrolysis gas under increased pressures to purify the pyrolysis gas; and a second step in which, at a pressure not higher than that in the first purification step, the purified gas obtained from the first purification step is further purified by adsorbing and removing gas containing carbon dioxide from the purified gas under increased pressure to recover hydrogen from the purified gas.

Preferred aspects include:
(2) The method according to (1), wherein the pressure in the first purification step is 0.15 MPa to 0.6 MPa;
(3) The method according to (1), wherein the pressure in the first purification step is 0.2 MPa to 0.6 MPa;
(4) The method according to (1), wherein the pressure in the first purification step is 0.2 MPa to 0.5 MPa;

(5) The method according to any one of (1) to (4), wherein the pressure in the second purification step is 0.15 MPa to 0.6 MPa;

(6) The method according to any one of (1) to (4), wherein the pressure in the second purification step is 0.2 MPa to 0.6 MPa;

(7) The method according to any one of (1) to (4), wherein the pressure in the second purification step is 0.2 MPa to 0.5 MPa;

(8) The method according to any one of (1) to (7), wherein the pressure in the first purification step is 0.15 MPa to 0.6 MPa and the pressure in the second purification step is 0.15 MPa to 0.6 MPa;

(9) The method according to any one of (1) to (7), wherein the pressure in the first purification step is 0.2 MPa to 0.6 MPa and the pressure in the second purification step is 0.2 MPa to 0.6 MPa;

(10) The method according to any one of (1) to (7), wherein the pressure in the first purification step is 0.2 MPa to 0.6 MPa and the pressure in the second purification step is 0.2 MPa to 0.5 MPa;

(11) The method according to any one of (1) to (10), wherein temperature in the first purification step and temperature in the second purification step is 0-100° C.;

(12) The method according to any one of (1) to (10), wherein temperature in the first purification step and temperature in the second purification step is 10-40° C.;

(13) The method according to any one of (1) to (10), wherein temperature in the first purification step and temperature in the second purification step is ambient temperature;

(14) The method for recovering hydrogen according to any one of (1) to (13), wherein gas mainly containing carbon dioxide adsorbed and removed in the first purification step is recovered;

(15) The method for recovering hydrogen according to any one of (1) to (14), wherein a differential pressure between the pressure in the first purification step and the pressure in the second purification step is 0-0.45 MPa;

(16) The method for recovering hydrogen according to any one of (1) to (14), wherein a differential pressure between the pressure in the first purification step and the pressure in the second purification step is 0-0.4 MPa;

(17) The method for recovering hydrogen according to any one of (1) to (14), wherein a differential pressure between the pressure in the first purification step and the pressure in the second purification step is 0-0.3 MPa;

(18) The method for recovering hydrogen according to any one of (1) to (14), wherein a differential pressure between the pressure in the first purification step and the pressure in the second purification step is 0-0.2 MPa;

(19) The method for recovering hydrogen according to any one of (1) to (14), wherein a differential pressure between the pressure in the first purification step and the pressure in the second purification step is 0-0.1 MPa;

(20) The method for recovering hydrogen according to any one of (1) to (19), wherein: the first purification step comprises two or more adsorption columns; the gas mainly containing carbon dioxide is adsorbed and removed in one adsorption column to purify the pyrolysis gas; then the adsorption column is switched to the other column, in which the gas mainly containing carbon dioxide is adsorbed and removed to purify the pyrolysis gas; meanwhile, in the one adsorption column which has already adsorbed and removed the gas mainly containing carbon dioxide, the adsorbed and removed gas mainly containing carbon dioxide is desorbed and recovered by reducing the pressure in the adsorption column;

(21) The method according to any one of (1) to (20), wherein the first purification step comprises 2-5 adsorption columns;

(22) The method for recovering hydrogen according to any one of (1) to (21), wherein: the second purification step comprises two or more adsorption columns; the gas containing carbon dioxide is adsorbed and removed in one adsorption column to purify the pyrolysis gas purified in the first purification stage; then the adsorption column is switched to the other column, in which the gas containing carbon dioxide is adsorbed and removed to further purify the pyrolysis gas purified in the first purification stage; meanwhile, in the one adsorption column which has already adsorbed and removed the gas containing carbon dioxide, the adsorbed and removed gas containing carbon dioxide is desorbed and recovered by reducing the pressure in the adsorption column;

(23) The method according to any one of (1) to (22), wherein the second purification step comprises 2-5 adsorption columns;

(24) The method according to any one of (1) to (23), wherein both the first purification step and the second purification step are configured by a pressure swing adsorption (PSA) apparatus;

(25) The method according to any one of (1) to (24), wherein an adsorbent used for adsorbing and removing the gas mainly containing carbon dioxide in the first purification step is one or more selected from a group consisting of imogolite, amorphous aluminum silicate, activated carbon, zeolite and activated alumina;

(26) The method according to any one of (1) to (24), wherein the adsorbent used for adsorbing and removing the gas mainly containing carbon dioxide in the first purification step is imogolite;

(27) The method according to any one of (1) to (26), wherein an adsorbent used for adsorbing and removing the gas containing carbon dioxide in the second purification step is one or more selected from a group consisting of imogolite, amorphous aluminum silicate, activated carbon, zeolite and activated alumina;

(28) The method according to any one of (1) to (26), wherein an adsorbent used for adsorbing and removing the gas containing carbon dioxide in the second purification step is activated carbon or zeolite;

(29) The method according to any one of (1) to (28), wherein the gas containing carbon dioxide adsorbed and removed in the second purification step is gas containing hydrogen, carbon dioxide and methane;

(30) The method according to any one of (1) to (29), wherein the pyrolysis gas encompasses gas obtained by steam-reforming the pyrolysis gas obtained by heat-treating the biomass.

Effects of Invention

The hydrogen recovery method of the present invention not only substantially reduces operating costs such as power consumption but also contributes to substantial reduction in apparatus costs, because it can recover highly concentrated hydrogen gas under a relatively low pressure, and moreover it does not require to combine special agents or apparatuses which have been used in prior art, e.g., adsorbents, separation membranes, etc. Additionally, the method can remarkably enhance safety in operation, because the operating pressure is low. In addition, the method allows overall reduction in power consumption, and thus it can also indirectly contribute to reduction in carbon dioxide generation.

DESCRIPTION OF EMBODIMENTS

Figure 1:
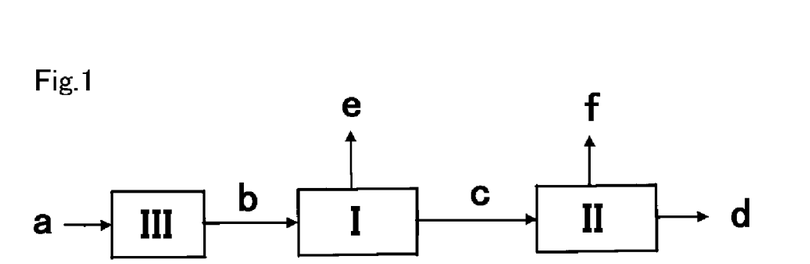
FIG. 1 is a schematic flow diagram of a hydrogen recovery method of the present invention.

The hydrogen recovery method of the present invention comprises a first purification step for adsorbing and removing gas mainly containing carbon dioxide from pyrolysis gas obtained by heat-treating biomass, and a second purification step for adsorbing and removing gas containing carbon dioxide from the purified gas obtained in the first purification step. As shown in FIG. 1, biomass (a) is charged into a biomass heat-treating step (III) (heat treatment apparatus) to produce pyrolysis gas (b). Herein, the pyrolysis gas (b) may be gas obtained by further steam-reforming the pyrolysis gas obtained by heat-treating the biomass, i.e., reformed gas. Subsequently, the produced pyrolysis gas (b) is charged into a first purification step (I), wherein gas (e) mainly containing carbon dioxide contained in the pyrolysis gas (b), e.g., gas mainly containing carbon dioxide and containing carbon monoxide, methane, hydrogen and the like as other components is adsorbed and removed by an adsorbent. Purified gas (c) from which the gas (e) mainly containing carbon dioxide has been removed (hereinafter referred to as "first purified gas" in some cases) is subsequently charged into a second purification step (II), wherein gas (0 containing carbon dioxide, e.g., gas containing hydrogen, carbon dioxide and methane, as well as optionally carbon monoxide and the like is adsorbed and removed by an adsorbent. Thereby, high-purity hydrogen gas (d) is recovered. On the other hand, the gas (e) mainly containing carbon dioxide adsorbed in the first purification step (I) and the gas (0 containing carbon dioxide adsorbed in the second purification step (II) are desorbed from the adsorbents and separately recovered. Herein, the gas (e) mainly containing carbon dioxide refers to gas containing carbon dioxide as a highest volume ratio in the gas, and besides carbon dioxide, it contains carbon monoxide, methane and hydrogen, and it may further contain a sulfur compound gas such as hydrogen sulfide and carbonyl sulfide, a nitrogen compound gas and the like. In addition, the gas (0 containing carbon dioxide refers to gas containing hydrogen, carbon dioxide and methane, and it may further contain carbon monoxide, sulfur compound gas, nitrogen compound gas and the like.

In the first purification step, carbon dioxide (gas mainly containing carbon dioxide) is primarily adsorbed and removed from the biomass pyrolysis gas. Also, water in the biomass pyrolysis gas can be adsorbed and removed. The adsorption and removal are carried out under increased pressure. The pressure has an upper limit of preferably 0.6 MPa, or more preferably 0.5 MPa, and a lower limit of preferably 0.15 MPa, or more preferably 0.2 MPa. A pressure below the lower limit is unfavorable, because the adsorbability of the adsorbent is lowered. In addition, although the gas mainly containing carbon dioxide can be adsorbed and desorbed even at a pressure lower than the lower limit, the adsorption layer becomes excessive because a large amount of adsorbent is required due to lowered adsorbability. On the other hand, a pressure above the upper limit is unfavorable because a great deal of power is required for pressurization. Operating temperature at the first purification step, i.e., operating temperature for concurrently adsorbing carbon dioxide, carbon monoxide and a hydrocarbon gas such as methane is preferably 0-100° C., more preferably 10-40° C. The operation is typically carried out at ambient temperature.

As the adsorbent in the first purification step, preferably one or more adsorbents selected from a group consisting of imogolite, amorphous aluminum silicate, activated carbon, zeolite and activated alumina, or more preferably one or more adsorbents selected from a group consisting of imogolite, amorphous aluminum silicate, activated carbon and zeolite are used. These adsorbents can be used as a single layer, or laminated multiple layers. More preferably, a single layer of imogolite or a single layer of amorphous aluminum silicate is used. Herein, as the amorphous aluminum silicate, a synthetic amorphous aluminum silicate (synthetic imogolite) is preferably used. As the synthetic amorphous aluminum silicate, a commercial product, e.g., Hasclay (registered trademark) manufactured by TODA KOGYO CORP. can be used.

In the first purification step, 30-80 vol % of carbon dioxide in the biomass pyrolysis gas can be removed. Since 20-40 vol % of carbon dioxide is normally present in the biomass pyrolysis gas, the purification in the first purification step can reduce the volume of carbon dioxide in the biomass pyrolysis gas to about 5 to 35 vol %. Carbon dioxide and other gases (gases mainly containing carbon dioxide) adsorbed and removed as described above in the first purification step are desorbed and recovered from the adsorbent by lowering the pressure in the column to normal pressure.

The first purification step is preferably configured by a pressure swing adsorption (PSA) apparatus. In the first purification step, preferably 2 or more, more preferably 2-5 adsorption columns (PSA adsorption columns) filled with the adsorbent are installed.

The operating method in the first purification step mainly includes the following two types. One method is a so-called continuous method. The biomass pyrolysis gas is pressurized to the above pressure; the gas kept at a constant pressure is continuously passed through one adsorption column for a predetermined time; in the adsorption column, the gas mainly containing carbon dioxide and optionally water are adsorbed by the adsorbent and removed; and unadsorbed gas, i.e., purified gas is continuously withdrawn. Subsequently, the column is switched to another adsorption column; the biomass pyrolysis gas is continuously passed therethrough for a predetermined time in the same manner as described above; in the other adsorption column, the gas mainly containing carbon dioxide is adsorbed and removed; and purified gas is continuously withdrawn. At this time, the one adsorption column in which the adsorbing operation has been already completed is depressurized, and the adsorbed gas mainly containing carbon dioxide is desorbed and recovered. Thereafter, in the one adsorption column, the adsorbent is regenerated if necessary, and the biomass pyrolysis gas is passed therethrough again. In this method, these operations are sequentially repeated.

In the above continuous method, the switching from the one adsorption column to another adsorption column is carried out within a time during which the adsorbability is not reduced, in consideration of the time of reducing the adsorbability (breakthrough time) of carbon dioxide and the like for the adsorbent charged into the one adsorption column. The time depends on the amount of the treated biomass pyrolysis gas, the amount of carbon dioxide and the like therein, the capacity of the adsorption column, the kind and amount of the adsorbent charged into the column, and the like, but it is typically on the order of 2 to 30 minutes. Typically, the time is preliminarily determined in accordance with experiments by measuring the concentration of carbon dioxide in the removed first purified gas and the concentration of carbon dioxide in the gas recovered through adsorption and removal in the first purification step, so that the concentration of carbon dioxide in the removed first purified gas is minimized. Alternatively or additionally, the concentration of hydrogen or carbon dioxide in the first purified gas flowing out from the adsorption column is continuously or intermittently measured, and it is possible to switch one adsorption column to another adsorption column when the hydrogen concentration in the first purified gas decreases to a concentration lower than a predetermined value or when the concentration of carbon dioxide exceeds a predetermined value. Subsequently, after charge of the biomass pyrolysis gas into the other adsorption column is started, in the one adsorption column which has already adsorbed and removed the gas mainly containing carbon dioxide, the adsorbed and removed gas mainly containing carbon dioxide is desorbed and recovered from the adsorbent by lowering the pressure in the column preferably to around atmospheric pressure.

Another method is a so-called semi-continuous method. The biomass pyrolysis gas is pressurized to the above pressure and charged into one adsorption column; the gas is kept at the pressure for a predetermined time; and in the adsorption column, the gas mainly containing carbon dioxide and optionally water are adsorbed by the adsorbent and removed. Subsequently, the column is switched to another adsorption column, and the biomass pyrolysis gas is charged into the other column and kept for a predetermined time in the same manner as described above. In the other adsorption column, the gas mainly containing carbon dioxide is adsorbed and removed. After switching to the other adsorption column, the one adsorption column in which the adsorbing operation has been already completed is depressurized to a predetermined pressure, and the unadsorbed gas, i.e., the purified gas is withdrawn. Then, the one adsorption column is depressurized, and the adsorbed gas mainly containing carbon dioxide is desorbed and recovered. Thereafter, in the one adsorption column, the adsorbent is regenerated if necessary, and the biomass pyrolysis gas is charged and kept again. In this method, these operations are sequentially repeated.

In the above semi-continuous method, the switching from the one adsorption column to another adsorption column is carried out within a time which is sufficient for the charged adsorbent adsorbs carbon dioxide and the like, in consideration of the relationship between the adsorbability of carbon dioxide and the like for the adsorbent charged into the one adsorption column and the amount of carbon dioxide and the like in the charged biomass pyrolysis gas. The time depends on the amount of the charged biomass pyrolysis gas, the amount of carbon dioxide and the like therein, the capacity of the adsorption column, the kind and amount of the adsorbent charged into the column, and the like, but it is typically on the order of 2 to 30 minutes. Typically, the time is previously determined in accordance with experiments by measuring the concentration of carbon dioxide in the adsorbed and removed first purified gas and the concentration of carbon dioxide in the gas recovered through adsorption and removal in the first purification step, so that the concentration of carbon dioxide in the removed first purified gas is minimized. Alternatively or additionally, the concentration of hydrogen or carbon dioxide in the gas in the adsorption column is continuously or intermittently measured, and it is possible to switch one adsorption column to another adsorption column when the hydrogen concentration in the gas in the adsorption column exceeds a predetermined value or when the concentration of carbon dioxide decreases to a concentration lower than a predetermined value. Subsequently, after the adsorption operation in the one adsorption column is completed, the pressure in the one adsorption column is depressurized to a predetermined pressure, and the unadsorbed gas, i.e., the purified gas is withdrawn. The predetermined pressure is preliminarily determined in accordance with experiments within such a range that the adsorbed and removed gas such as carbon dioxide and the like would not desorbed, in consideration of the kind, pore volume, specific surface area and the like of the charged adsorbent, the maximum pressure in the adsorption operation, the operating temperature, and the like. Typically, the predetermined pressure is on the order of 0.15-0.3 MPa. Subsequently, the adsorbed and removed gas mainly containing carbon dioxide is desorbed and recovered from the adsorbent by lowering the pressure in the one adsorption column preferably to around atmospheric pressure.

As described above, the purified gas (first purified gas) obtained from the first purification step is charged into the second purification step with keeping or reducing the pressure in the first purification step. At this time, a container may be provided between the first purification step and the second purification step, the first purified gas is once depressurized to preferably 0.1-0.3 MPa, more preferably 0.1-0.2 MPa, and then pressurized again by a pressurizing apparatus, e.g., a compressor, so that the gas can be charged into the second purification step.

In the second purification step, gases containing carbon dioxide, e.g., gases containing hydrogen, carbon dioxide and methane, and optionally carbon monoxide and the like are adsorbed and removed from the first purified gas. In addition, if a sulfur compound gas, a nitrogen compound gas or the like is contained, they are also adsorbed and removed. In the second purification step, the adsorption and removal of the gas containing carbon dioxide are carried out under increased pressure. The pressure has an upper limit of preferably 0.6 MPa, or more preferably 0.5 MPa, and a lower limit of preferably 0.15 MPa, or more preferably 0.2 MPa. A pressure below the lower limit is unfavorable, because the adsorbability of the adsorbent is lowered. In addition, although gas other than hydrogen, e.g., mainly methane, carbon monoxide or the like can be adsorbed and desorbed even at a pressure lower than the lower limit, the adsorption layer becomes excessive because a large amount of adsorbent is required due to lowered adsorbability. On the other hand, a pressure above the upper limit is unfavorable because a great deal of power is required for pressurization. The differential pressure between the pressure for adsorbing and removing the gas mainly containing carbon dioxide in the first purification step and the pressure for adsorbing and removing the gas containing carbon dioxide in the second purification step is preferably 0-0.45 MPa, more preferably 0-0.4 MPa, even more preferably 0-0.3 MPa, most preferably 0-0.1 MPa. Such a pressure difference is adopted, so that gas can be efficiently adsorbed and removed in the first and second purification steps. In addition, the operating temperature in the second purification step is the same as that in the first purification step, and is preferably 0-100° C., more preferably 10-40° C. The second purification step is usually carried out at ambient temperature.

As the adsorbent in the second purification step, one or more adsorbents selected from a group consisting of imogolite, amorphous aluminum silicate, activated carbon, activated alumina and zeolite are preferably used. They can be used as a single layer, or laminated multiple layers. More preferably, a single layer of activated carbon or zeolite is used.

The second purification step is preferably configured by a conventional hydrogen pressure swing adsorption (hydrogen PSA) apparatus used for recovering high-purity hydrogen. In the second purification step, preferably 2 or more, more preferably 2-5 adsorption columns (hydrogen PSA adsorption column) filled with the adsorbent are installed.

The operation method in the second purification step may also include two methods, i.e., a continuous method and a semi-continuous method, similarly to the operation method in the first purification step. All of operations such as adsorption and switching of the adsorption column in the continuous method and the semi-continuous method are carried out in the same manner as described with respect to the first purification step.

In the hydrogen recovery method of the present invention, hydrogen having a purity of 90 vol % or higher can be recovered by combining the first purification step and the second purification step as described above.

Methods and apparatuses for producing the pyrolysis gas (b) by heat-treating the biomass (a) are known. For example, the following method can be used for example: a method comprising: heat-treating biomass such as organic waste at 500-600° C. under a non-oxidizing atmosphere; mixing the generated pyrolysis gas with steam at 900-1,000° C.; and purifying the resulting reformed gas to recover hydrogen (Patent Document 7); or a method for gasifying organic waste, comprising: heat-treating organic waste at 400-700° C. under a non-oxidizing atmosphere; mixing the generated pyrolysis gas with steam at 700-1,000° C.; and purifying the resulting reformed gas to produce hydrogen-containing gas, wherein: purifying the reformed gas is carried out by passing the reformed gas through a layer containing aluminum oxide and/or a formed article thereof and kept at 400-700° C. and then further passing the resulting gas through a layer containing one or more substances selected from a group consisting of zinc oxide, iron oxide, calcium oxide and formed articles thereof and kept at 350-500° C.; and subsequently the reformed gas after the purification is passed through a shift reaction catalyst layer at 200-500° C. (Patent Document 8). As the pyrolysis gas (b), pyrolysis gas before steam reforming obtained in the above-mentioned method or the like can be used, but it is preferable to use gas in which hydrogen concentration is increased by steam-reforming the pyrolysis gas. Herein, although the biomass (a) is not particularly limited as long as it is described in Patent Documents 7 and 8, it is exemplified by a waste material from palm tree (empty fruit bunch: EFB, EFB fiber, palm kernel shell), coconut shell, coconut husk, a waste material from Jatropha tree, an unused waste wood from forests, a sawmill waste from a sawmilling factory, waste paper, rice straw, rice husk, food residue from a food factory, algae, sewage sludge, organic sludge, and the like.

The hydrogen recovery method of the present invention may further include a purification step of other substances as long as the effect of the present invention is not impaired. For example, when biomass containing a radioactive substance such as cesium is used, a step of adsorbing and removing the radioactive substance such as cesium can be provided prior to the first purification step for adsorbing and removing carbon dioxide of the present invention. Thereby, the method can also be used for recovering hydrogen from biomass containing radioactive waste or the like.

Hereinafter, the present invention will be described in more detail with reference to Examples, but the present invention is not limited by these Examples.

EXAMPLES

The biomass raw material used in Examples is as follows.

As the biomass raw material, pencil manufacture waste wood (manufactured by KITA-BOSHI PENCIL CO., LTD., derived from an incense cedar native of CA, USA) was used. The pencil manufacture waste wood was in a form of sawdust. The characteristics of the pencil manufacture waste wood are shown in Table 1.

TABLE 1

| Proximate Analysis | |
|---|---|
| Volatile Matter | 88.23 mass % |
| Ash | 0.37 mass % |
| Fixed Carbon | 11.40 mass % |
| Elementary Analysis | |
| Carbon | 50.90 mass % |
| Hydrogen | 7.30 mass % |
| Oxygen | 41.62 mass % |
| Nitrogen | 0.13 mass % |
| Sulfur | 0.03 mass % |
| Chlorine | 0.02 mass % |
| Lower Heating Value | 18.4 MJ/kg |

In Table 1, the proximate analysis values were measured in accordance with JIS M8812, and the elementary analysis values were measured in accordance with JIS M8819. Note that, in the elementary analysis values, "sulfur" and "chlorine" were measured by combustion-ion chromatography [combustion unit: Automatic Quick Furnace AQF-100 (trademark) manufactured by Mitsubishi Chemical Analytech Co., Ltd., gas-absorbing unit: Gas Absorptior Unite GA-100 (trademark) manufactured by Mitsubishi Chemical Analytech Co., Ltd., detection unit: an ion chromatograph Ion Chromatography System ICS-1000 (trade name) manufactured by Dionex Corporation]. Note that "oxygen" was calculated by subtracting the amount of elements other than oxygen from 100 mass %. In addition, a lower heating value was measured in accordance with JIS M8814. Herein, all the values are calculated on a dry mass basis.

Example 1

For pyrolysis and gas reforming of the biomass material, a cylindrical quartz tube having a diameter of 50 mm and height of 500 mm was used as a pyrolysis reactor, and a cylindrical stainless tube having a diameter of 50 mm and height of 500 mm was used as a reforming reactor. About 1 gram (dry weight) of pencil manufacture waste wood was charged into the pyrolysis reactor, and pyrolysis of the pencil manufacture waste wood was carried out at 550° C. with passing argon gas therethrough at 50 ml/min. Subsequently, the total amount of the resulting pyrolysis gas was fed into the reforming reactor, and at the same time, distilled water was fed to a heating zone of the reforming reactor at a rate of 0.04 ml/min and evaporated to produce water vapor, and the pyrolysis gas was reformed at 950° C. Thereby, 8.25 L of mixed gas of argon gas and reformed gas was obtained (0°

C. and 1 atm basis). Herein, the mixed gas contained 3.18 L of reformed gas and 5.07 L of argon gas. The mixed gas was analyzed using gas chromatography [GC-14A (trademark) manufactured by Shimadzu Corporation, carrier gas: argon]. The composition of the reformed gas contained in the mixed gas is as shown in the following Table 2. The hydrogen concentration was 61.42 vol %, and on the other hand, the carbon dioxide concentration was 23.02 vol %, the carbon monoxide concentration was 8.89 vol %, and the methane concentration was 6.67 vol %. In the analysis using the gas chromatography, since argon was used as a carrier gas, argon was not detected in the mixed gas subjected for the analysis. Subsequently, a gas purification test was carried out, in which hydrogen gas was recovered using the post-pyrolysis reformed gas obtained as described above. In addition, the reformed gas was repeatedly produced in order to obtain a gas amount capable of sufficiently performing the gas purification test described below.

TABLE 2

| Component | Concentration (vol %) |
| --- | --- |
| Hydrogen | 61.42 |
| Carbon Dioxide | 23.02 |
| Carbon Monoxide | 8.89 |
| Methane | 6.67 |

Figure 2:
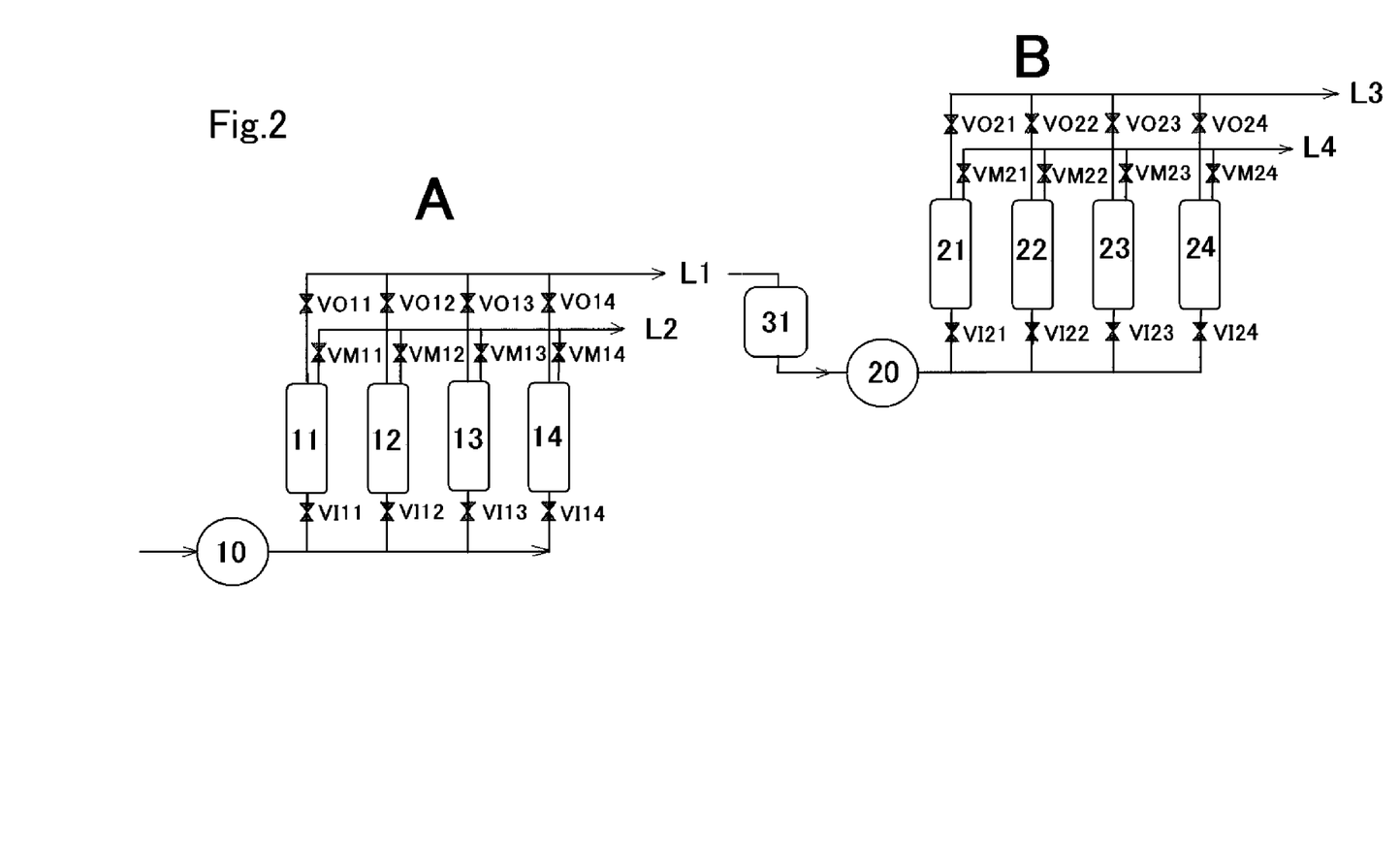
FIG. 2 is a schematic view of one embodiment of a hydrogen recovery apparatus (first purification step and second purification step) in the hydrogen recovery method of the present invention.

As the hydrogen recovery apparatus, one shown in FIG. 2 was used. In the first purification step (A), four adsorption columns (11, 12, 13, 14) were used with being connected in parallel. All of the four adsorption columns were made of stainless steel (SUS 304), all of which were cylindrical with an inner diameter of 40 mm and height of 300 mm. Each adsorption column was filled with about 60 g of synthetic imogolite (HASClay Gill (trademark) manufactured by TODA KOGYO CORP.) as an adsorbent. The synthetic imogolite used had a pore volume of 1 $cm^3/g$ and a specific surface area of about 500 $m^2/g$.

In the second purification step (B), four adsorption columns (21, 22, 23, 24) were used with being connected in parallel. The materials, sizes and shapes of these adsorption columns were the same as those of the adsorption columns used in the first purification step (A). Each adsorption column was filled with about 120 g of activated carbon (activated carbon Shirasagi X2M (trademark) manufactured by Japan EnviroChemicals, Limited) as an adsorbent.

As shown in FIG. 2, an intermediate tank (31) was installed between the first purification step (A) and the second purification step (B). In this example, as the intermediate tank (31), a gas bag made of natural rubber having an internal volume of 10 L was used.

As described above, the post-pyrolysis reformed gas obtained by heat-treating and reforming the pencil manufacture waste wood was charged into the first adsorption column (11) in the first purification step (A). First, an inlet valve (VI11) of the first adsorption column (11) was opened, and an outlet valve (VO11) and an adsorption gas withdrawal valve (VM11) were closed. At this time, all of inlet valves (VI12, VI13, VI14), outlet valves (VO12, VO13, VO14) and adsorption gas withdrawal valves (VM12, VM13, VM14) of the second adsorption column (12), the third adsorption column (13) and the fourth adsorption column (14) were closed. The post-pyrolysis reformed gas was charged by a compressor (10) so that the internal pressure of the first adsorption column (11) was 0.5 MPa. The amount of mixed gas charged was about 2.56 L (0° C., 1 atm). Then, the inlet valve (VI11) was closed, and the first adsorption column (11) was held in this state for 5 minutes to adsorb the gas mainly containing carbon dioxide. Subsequently, the outlet valve (VO11) was opened so as to reduce the pressure in the first adsorption column (11) to 0.2 MPa, and then the outlet valve (VO11) was closed. The withdrawn first purified gas (L1) was introduced into the intermediate tank (31). Subsequently, the adsorption gas withdrawal valve (VM11) was opened so as to reduce the pressure in the first adsorption column (11) to 0.1 MPa, and then the adsorption gas withdrawal valve (VM11) was closed. The withdrawn gas mainly containing carbon dioxide was recovered as the first purification step off-gas (L2). Then, argon gas was introduced and discharged from a cleaning gas inlet and outlet (not shown) into the first adsorption column (11) to regenerate the adsorbent.

In the above operation, the pressure in the first adsorption column (11) was adjusted to 0.5 MPa and the inlet valve (VI11) was closed, and at the approximately same time, the inlet valve (VI12) of the second adsorption column (12) was opened and the outlet valve (VO12) and the adsorption gas withdrawal valve (VM12) were closed. In this state, the post-pyrolysis reformed gas was charged by the compressor (10) so that the internal pressure of the second adsorption column (12) was 0.5 MPa, and the same operation as in the first adsorption column (11) was carried out in the second adsorption column (12). Thereafter, the same operations were sequentially repeated in the third adsorption column (13) and the fourth adsorption column (14), as well as in the first adsorption column (11) and the second adsorption column (12) again, and gas purification in the first purification step (A) was almost sequentially continued. All of these operations were carried out at ambient temperature.

The results of analyzing the post-purification gas (first purified gas (L1)) in the first purification step (A) using gas chromatography [GC-14A (trademark) manufactured by Shimadzu Corporation, carrier gas: argon] are as shown in the following Table 3, and the hydrogen concentration was increased to 89.70 vol %, meanwhile the carbon dioxide concentration was decreased to 7.97 vol %. In addition, the results of analyzing the first purification step off-gas (L2) mainly containing carbon dioxide using gas chromatography [GC-14A (trademark) manufactured by Shimadzu Corporation, carrier gas: argon) are as shown in the following Table 4, and the carbon dioxide concentration was 51.07 vol %, and hydrogen, carbon monoxide and methane were detected in 48.93 vol %.

TABLE 3

| Component | Concentration (vol %) |
| --- | --- |
| Hydrogen | 89.70 |
| Carbon Dioxide | 7.97 |
| Carbon Monoxide | 0.00 |
| Methane | 2.33 |

TABLE 4

| Component | Concentration (vol %) |
| --- | --- |
| Hydrogen | 8.74 |
| Carbon Dioxide | 51.07 |
| Carbon Monoxide | 25.44 |
| Methane | 14.75 |

The first purified gas (L1) withdrawn from the first purification step (A) was introduced into the intermediate tank (31) and depressurized to about 0.1 MPa. Subsequently, the first purified gas (L1) was charged into a first adsorption column (21) of the second purification step (B). First, an inlet valve (VI21) of the first adsorption column (21) was opened, and an outlet valve (VO21) and an adsorption gas withdrawal valve (VM21) were closed. At this time, all of inlet valves (VI22, VI23, VI24), outlet valves (VO22, VO23, VO24) and adsorption gas withdrawal valves (VM22, VM23, VM24) of the second adsorption column (22), the third adsorption column (23) and the fourth adsorption column (24) were closed. The first purified gas (L1) was charged by a compressor (20) so that the internal pressure of the first adsorption column (21) was 0.4 MPa. Then, the inlet valve (VI21) was closed, and the first adsorption column (21) was held in this state for 5 minutes to adsorb the gas containing carbon dioxide. Subsequently, the outlet valve (VO21) was opened so as to reduce the pressure in the first adsorption column (21) to 0.2 MPa, and then the outlet valve (VO21) was closed so as to withdraw the second purified gas (L3). Subsequently, the adsorption gas withdrawal valve (VM21) was opened so as to reduce the pressure in the first adsorption column (21) to 0.1 MPa, and then the adsorption gas withdrawal valve (VM21) was closed. The withdrawn gas containing carbon dioxide was recovered as the second purification step off-gas (L4). Then, argon gas was introduced and discharged from a cleaning gas inlet and outlet (not shown) into the first adsorption column (21) to regenerate the adsorbent.

In the above operation, the pressure in the first adsorption column (21) was adjusted to 0.4 MPa and the inlet valve (VI21) was closed, and at the approximately same time, the inlet valve (VI22) of the second adsorption column (22) was opened and the outlet valve (VO22) and the adsorption gas withdrawal valve (VM22) were closed. In this state, the first purified gas (L1) was charged by the compressor (20) so that the internal pressure of the second adsorption column (22) was 0.4 MPa, and the same operation as in the first adsorption column (21) was carried out in the second adsorption column (22). Thereafter, the same operations were sequentially repeated in the third adsorption column (23) and the fourth adsorption column (24), as well as in the first adsorption column (21) and the second adsorption column (22) again, and gas purification in the second purification step (B) was almost sequentially continued. All of these operations were carried out at ambient temperature.

The results of analyzing the post-purification gas (second purified gas (L3)) in the second purification step (B) using gas chromatography [GC-14A (trademark) manufactured by Shimadzu Corporation, carrier gas: argon] are as shown in the following Table 5, and the hydrogen concentration was increased to 91.78 vol %, meanwhile the carbon dioxide concentration was decreased to 6.61 vol %. In addition, the results of analyzing the second purification step off-gas (L4) containing carbon dioxide using gas chromatography [GC-14A (trademark) manufactured by Shimadzu Corporation, carrier gas: argon) are as shown in the following Table 6, and the carbon dioxide concentration was 10.44 vol %, and hydrogen, carbon monoxide and the like were detected in about 89.56 vol %.

TABLE 5

| Component | Concentration (vol %) |
| --- | --- |
| Hydrogen | 91.78 |
| Carbon Dioxide | 6.61 |
| Carbon Monoxide | 0.00 |
| Methane | 1.62 |

TABLE 6

| Component | Concentration (vol %) |
| --- | --- |
| Hydrogen | 85.93 |
| Carbon Dioxide | 10.44 |
| Carbon Monoxide | 0.00 |
| Methane | 3.63 |

Table 7 shows amount of the gas in each stream as the results of recovering hydrogen by treating 100 L of post-pyrolysis reformed gas obtained by heat-treating and reforming the pencil manufacture waste wood as described above. Herein, the unit of each number in Table 7 is liter. The second purified gas (L3) could be recovered in an amount of 41.89 L based on 100 L of the fed reformed gas, and its recovery rate was about 42 vol %. In addition, the reformed gas contained 61.42 L of hydrogen, 38.51 L of which could be recovered, and its recovery rate was about 63 vol %.

TABLE 7

| Component | Reformed Gas | First Purified Gas (L1) | First Purification Step Off-Gas (L2) | Second Purified Gas (L3) | Second Purification Step Off-Gas (L4) |
| --- | --- | --- | --- | --- | --- |
| Hydrogen | 61.42 | 58.44 | 2.98 | 38.51 | 19.93 |
| Carbon Dioxide | 23.02 | 5.07 | 17.95 | 2.7 | 2.37 |
| Carbon Monoxide | 8.89 | 0.00 | 8.89 | 0.00 | 0.00 |
| Methane | 6.67 | 1.35 | 5.32 | 0.68 | 0.67 |
| Total | 100.00 | 64.86 | 35.14 | 41.89 | 22.97 |

Example 2

A gas purification test was carried out, in which hydrogen gas was recovered using the post-pyrolysis reformed gas produced in the same manner as in Example 1. As a hydrogen recovery apparatus, the same apparatus as that in Example 1 was used, except that about 150 g of Zeolite A-5 (manufactured by Wako Pure Chemical Industries, Ltd.) as an adsorbent was charged into each of four adsorption columns (21, 22, 23, 24) in the second purification step (B). The purification conditions were also the same as in Example 1, except that the first purified gas (L1) was charged so that the internal pressures of the first adsorption column (21) to the fourth adsorption column (24) were 0.5 MPa in the second purification step (B).

The results of analyzing the purified gas (second purified gas (L3)) in the second purification step (B) using gas chromatography [GC-14A (trademark) manufactured by Shimadzu Corporation, carrier gas: argon] are as shown in the following Table 8, and the hydrogen concentration was increased to 99.01 vol %, meanwhile the carbon dioxide concentration was decreased to an extent where it was scarcely detected. In addition, the results of analyzing the second purification step off-gas (L4) containing carbon dioxide using gas chromatography [GC-14A (trademark) manufactured by Shimadzu Corporation, carrier gas: argon)] are as shown in the following Table 9, and the carbon dioxide concentration was 22.50 vol %, and hydrogen, carbon monoxide and the like were detected in about 77.50 vol %.

TABLE 8

| Component | Concentration (vol %) |
|---|---|
| Hydrogen | 99.01 |
| Carbon Dioxide | 0.00 |
| Carbon Monoxide | 0.00 |
| Methane | 0.99 |

TABLE 9

| Component | Concentration (vol %) |
|---|---|
| Hydrogen | 72.78 |
| Carbon Dioxide | 22.50 |
| Carbon Monoxide | 0.00 |
| Methane | 4.72 |

Table 10 shows amount of the gas in each stream as the results of recovering hydrogen by treating 100 L of the post-pyrolysis reformed gas obtained by heat-treating and reforming the pencil manufacture waste wood as described above. Herein, the unit of each number in Table 10 is liter. The second purified gas (L3) could be recovered in an amount of 42.04 L based on 100 L of the fed reformed gas, and its recovery rate was about 42 vol %. In addition, the reformed gas contained 61.42 L of hydrogen, 42.04 L of which could be recovered, and its recovery rate was about 68 vol %.

TABLE 10

| Component | Reformed Gas | First Purified Gas (L1) | First Purification Step Off-Gas (L2) | Second Purified Gas (L3) | Second Purification Step Off-Gas (L4) |
|---|---|---|---|---|---|
| Hydrogen | 61.42 | 58.44 | 2.98 | 42.04 | 16.4 |
| Carbon Dioxide | 23.02 | 5.07 | 17.95 | 0.00 | 5.07 |
| Carbon Monoxide | 8.89 | 0.00 | 8.89 | 0.00 | 0.00 |
| Methane | 6.67 | 1.35 | 5.32 | 0.00 | 1.35 |
| Total | 100.00 | 64.86 | 35.14 | 42.04 | 22.82 |

INDUSTRIAL APPLICABILITY

Since a high concentration of hydrogen gas can be recovered by using a relatively low pressure in the hydrogen recovery method of the present invention, the operation and apparatus costs can be considerably reduced, furthermore the safety in operation can be remarkably enhanced, and therefore the method is expected to be greatly utilized for hydrogen recovery from a pyrolysis gas obtained by heat-treating biomass in the future.

REFERENCE NUMERALS

I First Purification Step
II Second Purification Step
III Biomass Heat-Treating Step
a Biomass
b Pyrolysis Gas
c First Purified Gas
d High-Purity Hydrogen Gas
e Gas Mainly Containing Carbon Dioxide
f Gas Containing Carbon Dioxide
A First Purification Step
B Second Purification Step
L1 First Purified Gas
L2 First Purification Step Off-Gas Mainly Containing Carbon Dioxide
L3 Second Purified Gas
L4 Second Purification Step Off-Gas Containing Carbon Dioxide
10 Compressor in First Purification Step
11 First Adsorption column in First Purification Step
12 Second Adsorption column in First Purification Step
13 Third Adsorption column in First Purification Step
14 Fourth Adsorption column in First Purification Step
VI11 Inlet Valve of First Adsorption column
VI12 Inlet Valve of Second Adsorption column
VI13 Inlet Valve of Third Adsorption column
VI14 Inlet Valve of Fourth Adsorption column
VO11 Outlet Valve of First Adsorption column
VO12 Outlet Valve of Second Adsorption column
VO13 Outlet Valve of Third Adsorption column
VO14 Outlet Valve of Fourth Adsorption column
VM11 Adsorption Gas Withdrawal Valve of First Adsorption column
VM12 Adsorption Gas Withdrawal Valve of Second Adsorption column
VM13 Adsorption Gas Withdrawal Valve of Third Adsorption column
VM14 Adsorption Gas Withdrawal Valve of Fourth Adsorption column
20 Compressor in Second Purification Step
21 First Adsorption column in Second Purification Step
22 Second Adsorption column in Second Purification Step
23 Third Adsorption column in Second Purification Step
24 Fourth Adsorption column in Second Purification Step
VI21 Inlet Valve of First Adsorption column
VI22 Inlet Valve of Second Adsorption column
VI23 Inlet Valve of Third Adsorption column
VI24 Inlet Valve of Fourth Adsorption column
VO21 Outlet Valve of First Adsorption column
VO22 Outlet Valve of Second Adsorption column
VO23 Outlet Valve of Third Adsorption column
VO24 Outlet Valve of Fourth Adsorption column
VM21 Adsorption Gas Withdrawal Valve of First Adsorption column
VM22 Adsorption Gas Withdrawal Valve of Second Adsorption column
VM23 Adsorption Gas Withdrawal Valve of Third Adsorption column
VM24 Adsorption Gas Withdrawal Valve of Fourth Adsorption column
31 Intermediate Tank

The invention claimed is:
1. A method for recovering hydrogen from pyrolysis gas obtained by heat-treating biomass, comprising:

a first purification step comprising adsorbing and removing under a first pressure a first gas from the pyrolysis gas to obtain a first purified gas, the first gas having a composition in which carbon dioxide has a highest volume ratio in the first gas; and a second purification step comprising pressurizing the first purified gas to a second pressure, and adsorbing and removing under the second pressure a second gas from the first purified gas to recover hydrogen from the first purified gas, the second gas having a composition in which carbon dioxide, hydrogen, and methane are main components, wherein 30-80 vol % of the carbon dioxide in the first gas is removed in the first purification step, wherein the second pressure is not higher than the first pressure, wherein the first pressure is 0.15 MPa to 0.6 MPa and the second pressure is 0.15 MPa to 0.6 MPa, wherein each of the first purification step and the second purification step is performed at a temperature of 10-40° C., and wherein a first adsorbent for adsorbing and removing the first gas is imogolite or amorphous aluminum silicate, and a second adsorbent for adsorbing and removing the second gas is activated carbon or zeolite.

2. The method according to claim 1, wherein the first pressure is 0.2 MPa to 0.6 MPa and the second pressure is 0.2 MPa to 0.5 MPa.

3. The method for recovering hydrogen according to claim 1, wherein after the adsorbing and removing of the first gas in the first purification step, the first gas is recovered.

4. The method for recovering hydrogen according to claim 1, wherein a differential pressure between the first pressure and the second pressure is 0-0.3 MPa.

5. The method for recovering hydrogen according to claim 1, wherein a differential pressure between the first pressure and the second pressure is 0-0.1 MPa.

6. The method according to claim 1, wherein:
the method comprises performing the first purification step on two or more adsorption columns; and
the performing of the first purification step on two or more adsorption columns comprises:
adsorbing and removing the first gas on a first adsorption column;
then switching the first adsorption column to a second adsorption column, and further adsorbing and removing the first gas on the second adsorption column;
meanwhile, desorbing and recovering from the first adsorption column the adsorbed and removed first gas by reducing the first pressure in the first adsorption column.

7. The method according to claim 1, wherein the method is configured to recover hydrogen from a pyrolysis gas obtained by steam-reforming the pyrolysis gas obtained by heat-treating the biomass.

* * * * *